United States Patent [19]

Littler et al.

[11] 3,889,788
[45] June 17, 1975

[54] OVERHEAD CURRENT SUPPLY EQUIPMENT FOR ELECTRIC RAILWAYS

[75] Inventors: Joseph Littler, Huyton; Dennis Joseph Taylor, Ormskirk; Kenneth James Campbell, St. Helens, all of England

[73] Assignee: British Insulated Callender's Cables Limited, London, England

[22] Filed: Apr. 9, 1973

[21] Appl. No.: 349,551

Related U.S. Application Data

[63] Continuation-in-part of Ser. No. 139,681, May 3, 1971, abandoned.

[30] Foreign Application Priority Data

May 6, 1970 Germany.............................. 21815

[52] U.S. Cl................. 191/40; 174/137 K
[51] Int. Cl.............................. B60m 1/20
[58] Field of Search ................ 191/40–45; 174/137 R, 138 R, 149 B, 158 R, 169, 171

[56] References Cited
FOREIGN PATENTS OR APPLICATIONS 1,515,327 7/1969 Germany.............................. 191/40
1,164,459 3/1964 Germany.............................. 191/40

Primary Examiner—M. Henson Wood, Jr.
Assistant Examiner—D. W. Keen
Attorney, Agent, or Firm—Buell, Blenko & Ziesenheim

[57] ABSTRACT

A support in overhead current supply equipment of an electric railway comprises a rigid base secured to a tunnel, overbridge or the like and located to one side of the vehicle load gauge, an inclined strut extending upwards and inwards to a point higher than the highest point of the load gauge, and a resin-bonded glass fibre beam extending inwards from the upper end of the strut. The strut may be made of metal and grounded, or in a support for the highest voltages (e.g. 50 kV) it may be of insulating material so that the junction between the strut and the beam is at an intermediate voltage.

14 Claims, 9 Drawing Figures

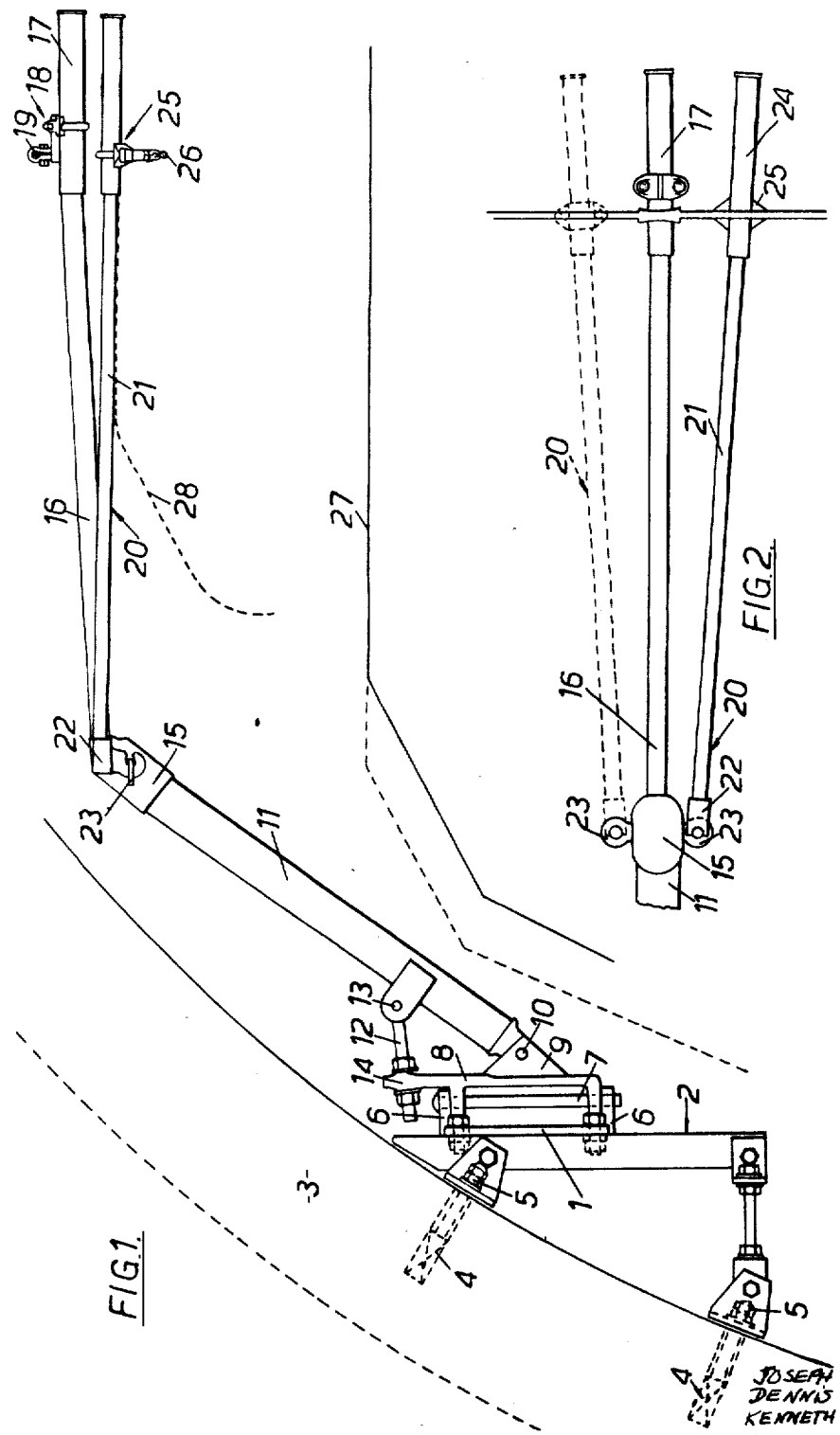

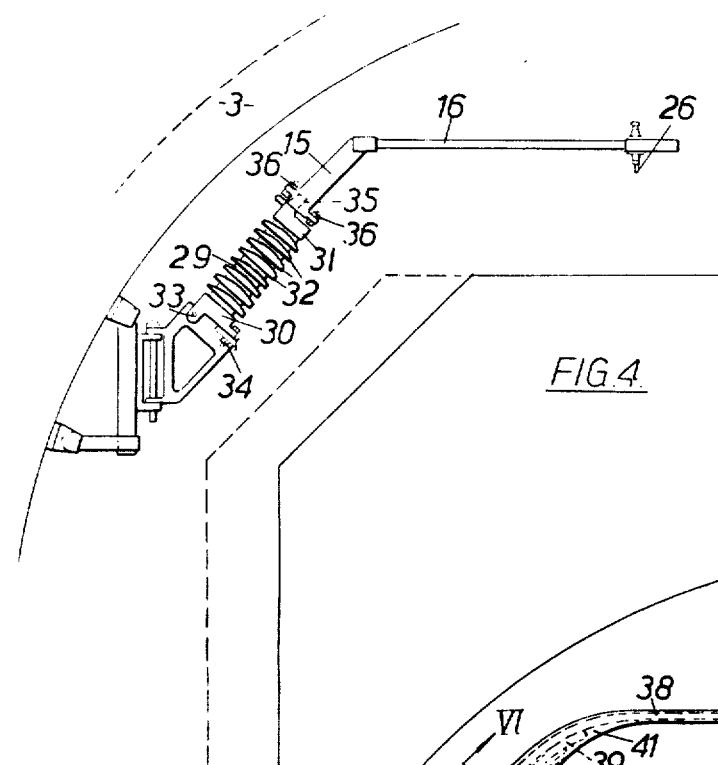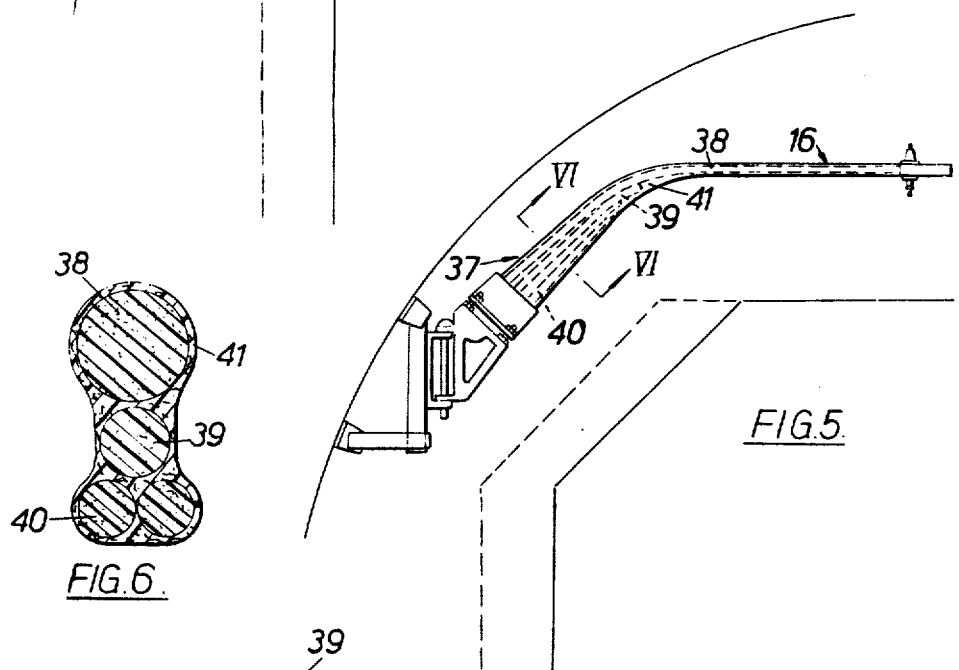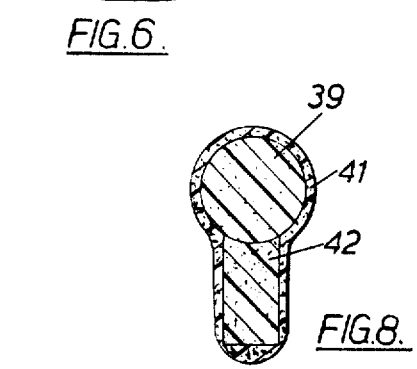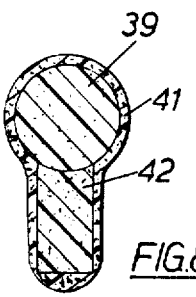

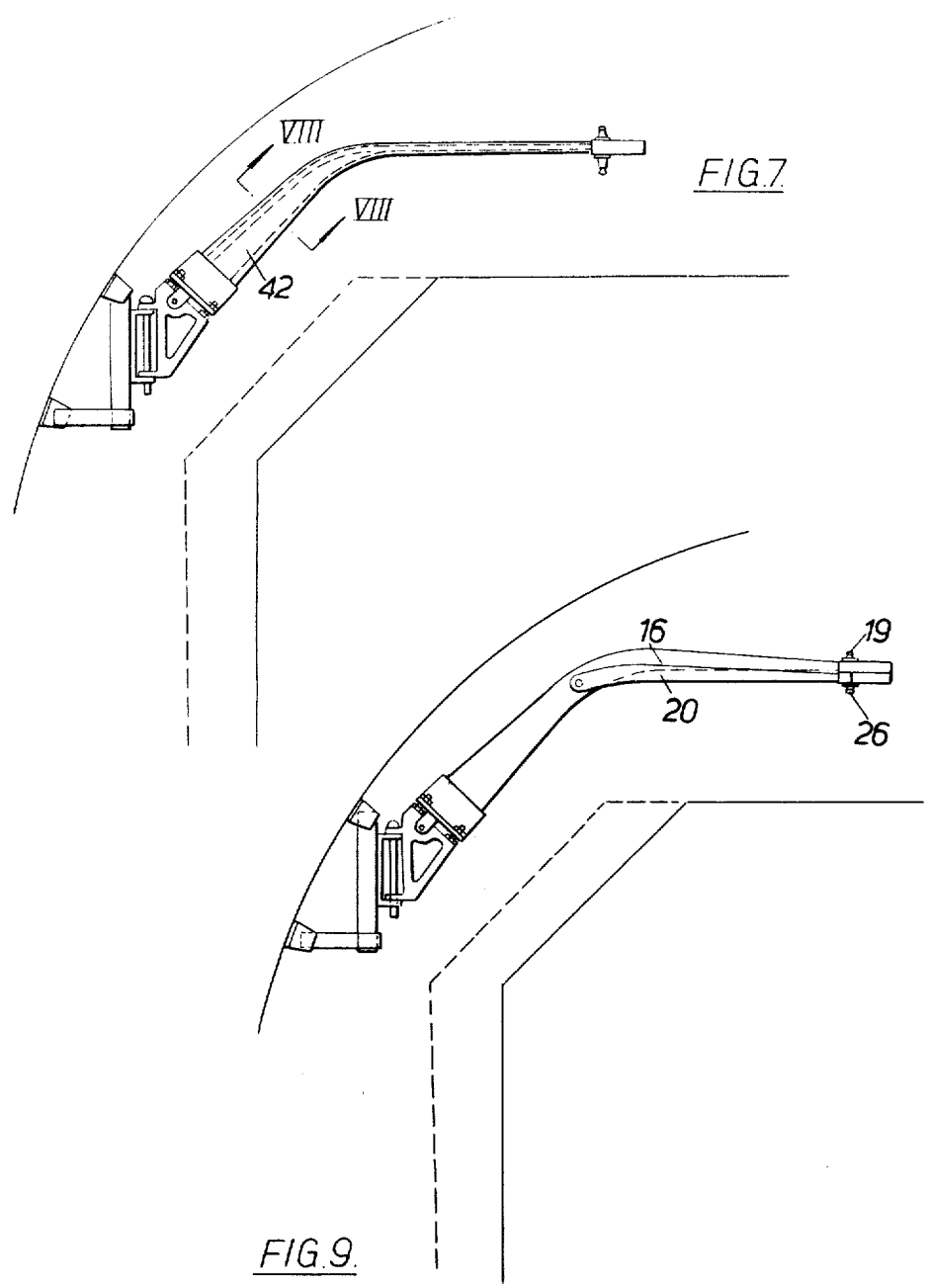

OVERHEAD CURRENT SUPPLY EQUIPMENT FOR ELECTRIC RAILWAYS

This is a continuation-in-part of our application Serial No. 139,681 filed May 3, 1971 now abandoned.

This invention relates to overhead current supply equipment of electric railways, which term includes any traction system in which vehicles are constrained to move in a predetermined path or in one of a number of predetermined paths.

More particularly it relates to insulating supports securing the overhead conductors of such systems where they pass through tunnels, overbridges and the like, hereinafter called "overhead structures." Especially in systems operating at higher voltages (e.g. 25 – 50kV), a significant part of the initial installation cost is often due to the structural engineering work involved in providing the necessary clearance between equipment at the contact-wire potential and both the overhead structures and the vehicles of the system. The main object of the present invention is to provide a type of support which enables this structural engineering work to be reduced or in favourable cases to be eliminated altogether.

In accordance with the invention, a support in overhead current supply equipment of an electric railway comprises a substantially rigid base secured to an overhead structure and located to one side of the vehicle load gauge, an inclined strut extending upwards and inwards to a point higher than the highest point of the load gauge and being secured to the said base in a manner inhibiting rotation about a horizontal axis, a resin-bonded glass fibre beam constituting at least a substantial part of the insulation of the support and extending inwards from the upper end of the said strut and being secured to it in a manner inhibiting rotation about a horizontal axis, and a fitting securing at least one overhead wire of the system to the free end of the said beam.

In most cases the point to which the strut extends will be closer to the overhead structure than would be permissible if this point on the support were at the contact wire potential.

Although the connections between the base and the strut and between the strut and the beam must inhibit rotation of the support member about a horizontal axis, in most cases it will be essential for one of them, preferably the former, to permit rotation about a vertical axis, in order to allow longitudinal movement of the supported wire. It is also desirable that the angle of inclination of the strut should be adjustable at the time of installation to accommodate variations in the profile of the overhead structure and/or in the position of the overhead wire. For moderate voltages the strut is preferably of electrically conducting material, for example galvanised steel, and is electrically grounded (earthed), but for the highest voltages an insulating strut may be more favourable.

The term "glass fibre" is to be understood in a broad sense as including any inorganic insulating fibres of high tensile strength. The resin-bonded glass fibre beam will usually be a rod of circular cross-section, but other cross sections may be adopted; for example the beam may be of square, rectangular or H-section. Hollow sections can also be used, but unless they are filled, for example with cellular plastics material or with compressed insulating gas, considerable care will be necessary in sealing the ends.

In some cases the wire which is supported by the fitting described may be the contact wire for the pantograph or other current collector, in which case the resin bonded glass fibre beam provides at least a major part of the necessary resilience in the support, in accordance with U.K. Pat. No. 1,291,842 of British Insulated Callender's Construction Company Limited (Joseph Littler). In other cases the fitting may support a catenary wire, the contact wire being supported from the catenary wire by droppers, and in such cases the fitting preferably comprises at least one resin-bonded glass fibre steady arm flexibly connected at one of its ends to the upper end of the inclined strut and at its other end carrying securing means for the contact wire. Such a steady arm serves to control the lateral position of the contact wire without significantly restricting vertical movement thereof. In still other cases, a catenary wire and the contact wire may both be secured to the free end of the resin-bonded glass-fibre beam, or to the free end of the resin-bonded glass fibre beams supported by the inclined strut as described; or the catenary wire and the contact wire may be secured to separate supports of the kind described.

The invention will be further illustrated, by way of example with reference to the accompanying drawings wherein:

FIGS. 1 and 2 show in elevation and scrap plan respectively a system incorporating one specific form of support;

FIGS. 4 and 5 are views, similar to FIG. 1, of two other supports;

FIG. 6 is a section on the line VI—VI in FIG. 5;

FIGS. 7 and 8 are views, similar to FIGS. 5 and 6 respectively, of a further support; and FIG. 9 is a view, similar to FIG. 1, of another modified support.

Figure 3:
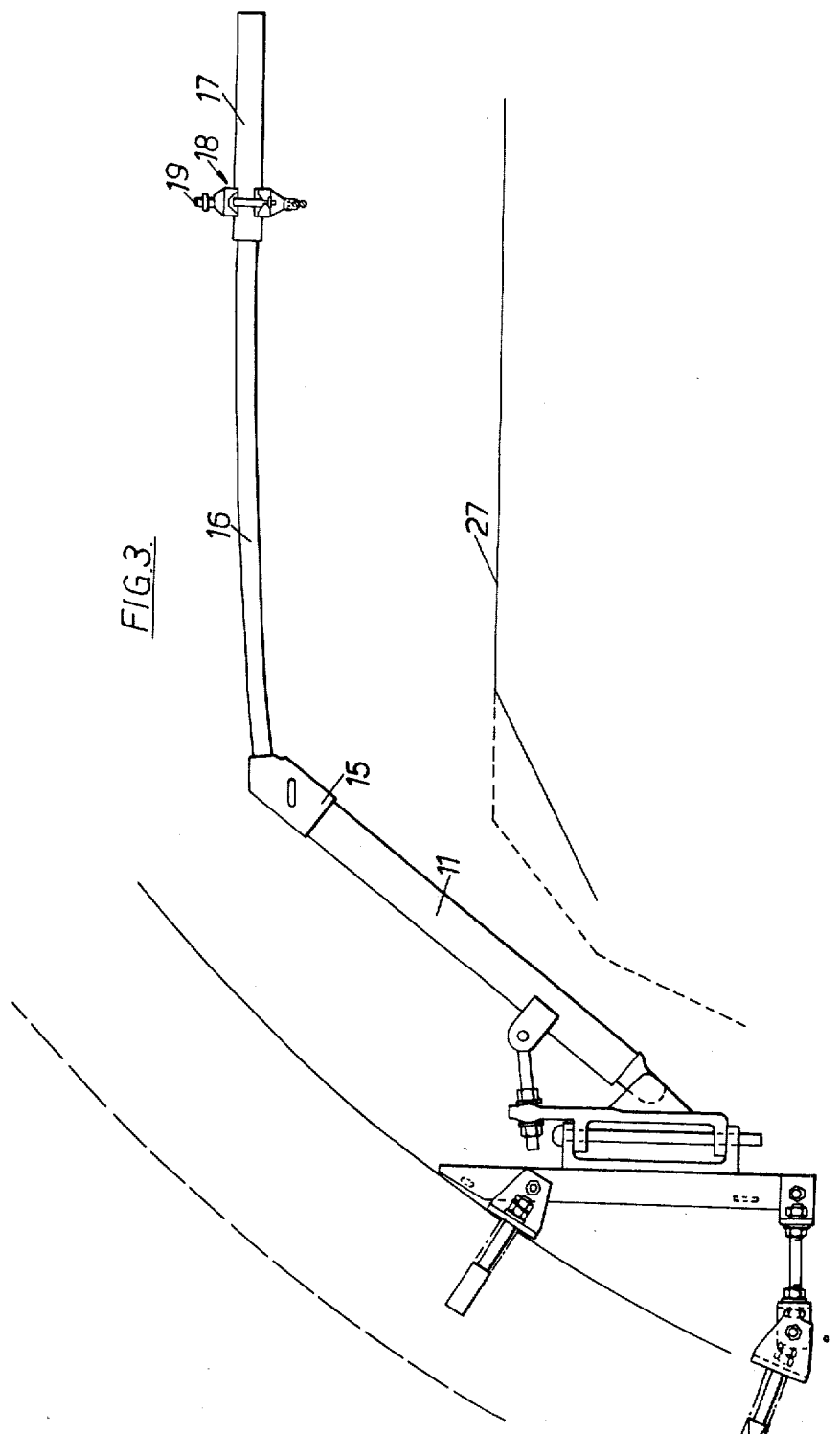
FIG. 3 is a view, similar to FIG. 1, showing a modified form of support.

The base of the support shown in FIGS. 1 and 2 comprises a galvanised steel upright 1 attached to a bracket 2, secured to the tunnel 3 by plugs 4 and screws 5. This supports a pair of lugs 6, which are apertured to receive a vertical hinge pin 7, on which is mounted a bracket 8, carrying a clevis 9, with a horizontal pin 10, to which is attached an end-fitting on a tubular galvanised steel strut 11 of 80 mm diameter and 850 mm long which is upwardly inclined at an angle of around 45°. This angle can be adjusted by means of an eyebolt 12 engaging a pivot provided on the strut and secured through an oversize hole in an upward extension 14 of the bracket by means of a pair of nuts.

At its upper end, the strut carries a second end-fitting 15, having a socket into which a round resin-bonded glass fibre beam 16, which is 30 mm in diameter and about 920 mm long is secured by glue assisted by a transverse pin (which may be a steel rivet or a resin-bonded glass fibre dowel). In the unloaded condition this beam is slightly inclined to the horizontal with its free end higher and at its free end carries a length of metal tubing 17 similarly attached to the beam. At an appropriate position along the length of this tube is mounted a support fitting 18 for the catenary wire 19 of the system.

The contact wire is steadied by means of a pair of resin-bonded glass-fibre arms 20, one on each side of the beam supporting the catenary wire. Each steady arm comprises a resin-bonded glass-fibre rod 21, of 25 mm diameter and approximately the same length as the beam. Each has at one end an eye fitting 22, which is secured to it by glue or by a compression joint, the eyes being engaged by pivots on respective sides of the upper end-fitting of the inclined strut. Each steady arm has a tubular end fitting 24, similarly attached at its free end and a contact wire clamp 25 is adjustable along the length of this end fitting. An adjustment range of about 300 mm is satisfactory. The contact wire is shown at 26 (FIG. 1).

All of the glass-fibre components are provided with a covering, in the form of a coating or sleeve, of a material resistant to tracking, for example of p.t.f.e., silicone rubber, suitable butyl rubber composition or track-resistant cycloaliphatic epoxy resin compositions. This covering is preferably adhesively attached or otherwise securely bonded both to teh surfaces of the resin-bonded glass-fibre components and to the metallic end-fittings.

The form of support described can be used without structural engineering work on the overhead structure where the clearance between the load gauge and the overhead structure in the vicinity of the inclined strut member is equal to about 300 mm or more in a 25kV system.

The support shown in FIG. 3 is substantially identical except that the steady arms are omitted and both the catenary wire 19 and the contact wire 26 supported by the resin-bonded glass-fibre beam.

In FIGS. 1 and 3 the vehicle load gauge of the system is indicated at 27 (the dotted portion including an allowance for sway) and in FIG. 1 the normal position of the current-collecting pantograph shoe is indicated at 28 (the free ends of the beam 16 and the rods 21 and with them the wires 19, 26 rise as the collector passes).

The supports so far described are preferred forms for service voltages up to about 25kV, but they present certain difficulties at higher voltages. FIGS. 4-9 show designs for higher voltages; they have been designed primarily for service at 50kV and insofar as dimensions are specified they are appropriate to that voltage, it being appreciated that smaller clearances will be acceptable at lower voltages and greater clearances and flashover distances will be necessary at higher voltages.

The support shown in FIG. 4 is basically similar to that shown in FIG. 3 except that the grounded metal strut 11 is replaced by a high-strength ceramic insulator 29 having metallic end fittings 30,31 and "sheds" 32. It will be appreciated that the upper end fitting 31, together with the main end fitting 15 supporting the resin-bonded glass-fibre beam 16 will, when the system is energised, be at a potential intermediate between ground potential and the potential of the contact wire 26; a semiconducting glaze may be applied to the ceramic insulator if required to regulate and stabilise this intermediate potential.

It is desirable for the clearance between these intermediate potential end fittings 15,31 and the tunnel wall 3 to be adjustable independently of the height of the contact wire, and this is provided for by mounting the end-fitting 30 on a pivot 33 in the bracket 8 and fitting an adjusting screw 34 and similarly mounting the end fitting 15 on a pivot 35 on the end fitting 31 and fitting adjusting screws 36. Desirably the intermediate potential in a 50kV system should be one half of the system voltage, i.e., 25kV and in this case a minimum clearance of about 8 inches will be required between the intermediate potential end fittings and the tunnel wall. The clearance required for parts at contact-wire potential will be about twice as great, and depending on atmospheric conditions, a creepage path of approximately 65 inches will be required; this may be made up of about 40 inches of resin-bonded fibre glass rod 16 and about 25 inches of ceramic surface, which latter is readily achieved with a shedded insulator with an actual length between end fittings of about 16 inches.

FIGS. 5 and 6 show a form of support in which the inclined strut 37 is formed integrally with the beam 16. A main resin-bonded fibre glass rod 38, bent to an appropriate shape, is embedded together with reinforcing rods 39,40 in a cast resin body 41. The modification shown in FIGS. 7 and 8 uses a shaped stiffening member 42 cut from resin-bonded glass-fibre sheet material in place of the rods 39,40. A further alternative is to cut the whole insulating body from a slab of resin-bonded glass-fibre laminate material. These designs lack the independent adjustment described in connection with FIG. 4, but the elimination of ceramic material reduces risk of breakage and the elimination of metallic fittings at intermediate potential permits reduction of transverse dimensions in the region of the strut/beam junction, which may reduce clearance problems in particular cases.

The fitting shown in FIG. 9 is similar to that of FIGS. 5 and 6 except that the beam 16 is relatively rigid; this supports a catenary wire 19 from which contact wire 26 is supported by droppers in the usual way; at least one hinged contact registration arm (steady arm) 20 is provided (compare FIGS. 1 and 2).

What we claim as our invention is:

1. In overhead current supply equipment of an electric railway, comprising at least one overhead wire that passes through an overhead structure an insulating support comprising a substantially rigid base secured to said overhead structure and located to one side of the vehicle load gauge, a single simple inclined strut extending upwards and inwards to a point higher than the highest point of the load gauge and being secured to said base to inhibit rotation about a horizontal axis, a resin-bonded glass fibre beam providing insulation for the support and extending inwards from the upper end of the said strut and being secured to it to inhibit rotation about a horizontal axis, and a fitting securing said overhead wire to the free end of said beam.

2. A support as claimed in claim 1 wherein said resin-bonded glass-fibre beam provides at least a major part of the resilience in the support.

3. A support as claimed in claim 1 in which said wire that is secured to the free end of said support is a catenary wire and in which a contact wire is supported from said catenary wire by droppers.

4. A support as claimed in claim 3 further comprising at least one resin-bonded fibre glass steady arm flexibly connected at one of its ends to the upper end of said inclined strut and secured at its other end to said contact wire.

5. A support as claimed in claim 1 in a system having a catenary wire and a contact wire supported from said catenary wire by droppers in which both said catenary wire and said contact wire are secured to the free end of said resin-bonded fibre glass beam.

6. A support as claimed in claim 1 in which said strut is rotatable about a vertical axis with respect to said base.

7. A support as claimed in claim 1 in which said beam is rotatable about a vertical axis with respect to said strut.

8. A support as claimed in claim 1 in which the said strut is of electrically conducting material and is electrically grounded.

9. In overhead current supply equipment of an electric railway, comprising at least one overhead wire that passes through an overhead structure, an insulating support comprising a substantially rigid base secured to said overhead structure and located to one side of the vehicle load gauge, a single simple straight metal strut extending from said base upwards and inwards to a point higher than the highest point of the load gauge, said strut being secured to said base to inhibit rotation about a horizontal axis and being electrically grounded, a resin-bonded glass fibre beam providing insulation for the support and extending inwards from the upper end of the said strut and being secured to it to inhibit rotation about a horizontal axis, and a fitting securing said overhead wire to the free end of said beam.

10. In overhead current supply equipment of an electric railway, comprising at least one overhead wire that passes through an overhead structure, an insulating support comprising a substantially rigid base secured to said overhead structure and located to one side of the vehicle load gauge, a single simple strut of insulating material providing insulation for the support, said strut extending from said base upwards and inwards to a point higher than the highest point of the load gauge, said strut being secured to said base to inhibit rotation about a horizontal axis, a resin-bonded glass-fibre beam providing further insulation for the support and extending inwards from the upper end of said strut and being secured to it to inhibit rotation about a horizontal axis, and a fitting securing said overhead wire to the free end of said beam.

11. A support as claimed in claim 10 in which said strut comprises a ceramic insulator.

12. A support as claimed in claim 10 mounted with said upper end of said strut spaced from said overhead structure a distance less than the minimum allowable clearance from contact-wire potential to ground.

13. In overhead current supply equipment of an electric railway, comprising at least one overhead wire that passes through an overhead structure, an insulating support comprising a substantially rigid base secured to said overhead structure and located to one side of the vehicle load gauge, an integral insulating body consisting essentially of resin-bonded glass-fibre providing insulation for the support, said insulating body comprising a strut extending from said base upwards and inwards to a point higher than the highest point of the load gauge and a beam extending inwards from the upper end of said strut, said insulating body being secured to said base to inhibit rotation about a horizontal axis, and a fitting securing said overhead wire to the free end of said beam.

14. A support as claimed in claim 13 wherein said insulating body is a cast resin body having embedded therein a bent resin-bonded glass-fibre rod that extends continuously through said strut and through said beam and additional resin-bonded glass fibre reinforcement in said strut.

* * * * *